(12) United States Patent
Imanishi et al.

(10) Patent No.: US 9,184,456 B2
(45) Date of Patent: Nov. 10, 2015

(54) FUEL CELL SYSTEM AND METHOD FOR LIMITING CURRENT THEREOF

(75) Inventors: Hiroyuki Imanishi, Toyota (JP); Kota Manabe, Toyota (JP); Tomoya Ogawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1418 days.

(21) Appl. No.: 12/744,521

(22) PCT Filed: Nov. 17, 2008

(86) PCT No.: PCT/JP2008/070869
§ 371 (c)(1),
(2), (4) Date: May 25, 2010

(87) PCT Pub. No.: WO2009/069492
PCT Pub. Date: Jun. 4, 2009

(65) Prior Publication Data
US 2010/0248055 A1    Sep. 30, 2010

(30) Foreign Application Priority Data

Nov. 26, 2007  (JP) .................................. 2007-304918

(51) Int. Cl.
*H01M 8/04* (2006.01)

(52) U.S. Cl.
CPC ........ *H01M 8/0491* (2013.01); *H01M 8/04552* (2013.01); *H01M 8/04582* (2013.01); *Y02E 60/50* (2013.01)

(58) Field of Classification Search
CPC ................... H01M 8/04544; H01M 8/04552; H01M 8/04559; H01M 8/04574; H01M 8/04582; H01M 8/04589; H01M 8/0491; H01M 8/04858; H01M 8/04865; H01M 8/04895; H01M 8/04902
See application file for complete search history.

(56) References Cited

U.S. PATENT DOCUMENTS 6,379,826 B1 * 4/2002 Lacy .............................. 429/432
2010/0136451 A1   6/2010 Imanishi et al.

FOREIGN PATENT DOCUMENTS

DE          10056843 B4   5/2007
DE       112008001661 B4  11/2013
(Continued)

OTHER PUBLICATIONS

Bequette, B. Wayne. Process control : modeling, design, and simulation, Upper Saddle River, N.J. : Prentice Hall PTR, 2003, Chapter 5.*

*Primary Examiner* — Carlos Barcena
(74) *Attorney, Agent, or Firm* — Kenyon & Kenyon LLP

(57) ABSTRACT

In a fuel cell system comprising a fuel cell with plural cells and performing processing for limiting a supply current to a load by performing a compensation computation with respect to a system-request current corresponding to a system-request power requested by the system based on the lowest cell voltage in the cells, the compensation computation being performed for limiting the supply current through a PI compensation using, as a reference value, a current value of the system-request current as of the time when the lowest cell voltage falls below a predetermined lowest-cell-voltage acceptable value, values for gains in the PI compensation for limiting the supply current are different from values for gains in the PI compensation for restoring the supply current. The system-request current can be securely limited in any operation statuses, and in addition, the supply current can be made rapidly responsive during the limitation of the current, while the supply current can be stably converged during the current restoration.

6 Claims, 5 Drawing Sheets

(56) References Cited

FOREIGN PATENT DOCUMENTS

| JP | 2001-210346 A | 8/2001 |
| JP | 2003-187842 A | 7/2003 |
| JP | 2003-282115 A | 10/2003 |
| JP | 2003-346849 A | 12/2003 |
| JP | 2005-197008 A | 7/2005 |
| JP | 2007-115442 A | 5/2007 |

* cited by examiner

FUEL CELL SYSTEM AND METHOD FOR LIMITING CURRENT THEREOF

This is a 371 national phase application of PCT/JP2008/070869 filed 17 Nov. 2008, which claims priority to Japanese Patent Application No. 2007-304918 filed 26 Nov. 2007, the contents of which are incorporated herein by reference.

BACKGROUND

1. Field of the Invention

The invention relates to a fuel cell system provided with a fuel cell having a plurality of cells, and particularly to current limiting processing and current restoration processing while a system-request current is being controlled.

2. Background of the Invention

Among fuel cells for generating electrical power utilizing an electrochemical reaction between hydrogen and oxygen, polymer electrolyte fuel cells are commonly known. The polymer electrolyte fuel cell includes a stack which is constituted from a plurality of stacked cells. The cells constituting the stack each include an anode (fuel electrode) and a cathode (air electrode), and a solid polymer electrolyte membrane having a sulfonic acid group as an ion exchange group is interposed between each anode and cathode.

A fuel gas containing a hydrogen gas (hydrogen-enriched reformed hydrogen obtained by reforming hydrogen gas or hydrocarbon) is supplied to the anode, while an oxygen-containing gas (oxidant gas), e.g., air, as an oxidant is supplied to the cathode. Upon the supply of the fuel gas to the anode, hydrogen contained in the fuel gas reacts with a catalyst in a catalyst layer which constitutes the anode, thereby generating hydrogen ions. The generated hydrogen ions pass through the solid polymer electrolyte membrane and electrically react with oxygen in the cathode. Electrical power is thus generated through the electrochemical reaction.

In a situation where a fuel cell having a plurality of cells is used, when even only one of the plurality of cells becomes unable to generate electrical power, the entire fuel cell becomes unable to generate electrical power. Under such circumstances, for example, JP 2003-187842 A has proposed an invention in which the voltage of each cell is measured and the amount of electrical power that can be output by a fuel cell stack is calculated based on the lowest cell voltage having the lowest value in the measured cell voltages, while the fuel cell stack generates an electrical energy equal to or smaller than the amount of electrical power which can be output, so that, even when the performance of an arbitrary cell is degraded, the fuel cell stack can operate in a suitable operation state in accordance with the degradation of the performance of the cell.

In addition, JP 2005-197008 A has proposed an invention in which a target current-limit value for limiting a power generation current to be taken out from a fuel cell in accordance with the lowest cell voltage VLOW is set, and, when the difference between an actual current-limit value and the power generation current is below a predetermined value, the current-limit value is replaced with the target current-limiting value.

However, in conventional fuel cell systems, when electrical power to be generated by the fuel cell is controlled or a supply current to be supplied to a load is limited under certain conditions, a system-request power, being the reference for the limiting computation, in the fuel cell increases, and the fuel cell system might eventually become unable to perform limiting processing for the power to be generated or the supply current. A possible example would be a situation where, in an automobile equipped with such a fuel cell system, a power to be generated or a supply current is limited when a driver is trying to accelerate the automobile. When the power to be generated or a supply current is limited, the driver feels as if a motor output is insufficient and performs an operation such as further stamping on an accelerator. As a result of the increase in system-request power due to such an operation, the power to be generated or supply current also increases, and consequently necessary limiting processing cannot be performed.

Also, in conventional fuel cell systems, even though there is a difference between the response required in current limiting processing for reducing a supply current and the response required in current restoration processing for increasing the limited supply current, a common response has been set without taking the difference into account. In other words, if one of cell voltages falls below a lowest-cell-voltage acceptable value, a current value of an actual supply current is limited. Then the limited state is maintained until the relevant cell voltage increases and reaches such a acceptable value, and after the cell voltage reaches such a acceptable value, the supply current value is restored to the system-request current. At this time, the current limiting processing is required to rapidly limit a current; however since the current restoration processing has been controlled using the same response as in the current limiting processing, overshooting might occur in the supply current during the current restoration processing. On the other hand, if the response that will not cause overshooting in the current restoration processing is set, it is expected that the response will be poor at current limiting processing.

Patent document 1: JP2003-187842 A
Patent document 2: JP2005-197008 A

SUMMARY OF INVENTION

In light of the problems of the conventional techniques above, an object of the present invention is to provide a fuel cell system that enables a system-request current to be securely limited in any operation statuses, and also enables a supply current to be made rapidly responsive when the current is limited while enabling the supply current to be stably converged when the current is restored.

In order to achieve the object above, a fuel cell system according to an aspect of the present invention includes a fuel cell with a plurality of cells and performs processing for limiting a supply current to be supplied to a load by performing a compensation computation with respect to a system-request current corresponding to a system-request power requested by the system based on the lowest cell voltage in the cells, the compensation computation being performed for limiting the supply current through a PI compensation using, as a reference value, a current value of the system-request current as of the time when the lowest cell voltage falls below a predetermined lowest-cell-voltage acceptable value, wherein values for gains in the PI compensation for limiting the supply current are different from values for gains in the PI compensation for restoring the supply current.

With such a configuration, when the lowest cell voltage in the cells falls below the predetermined lowest-cell-voltage acceptable value, the system-request current value at this time is used as a reference value for performing the PI compensation, and therefore an increase in the system-request power in accordance with the decrease in the supply current during the current limiting processing can be suppressed, thereby realizing reliable current limiting processing. For example, even when a driver regards a current-limited state as being an output shortage and stamps on an accelerator in an automobile equipped with the fuel cell system, the reference value for the computation of the supply current is fixed to the current value at the time of starting the current limiting processing, and therefore the current can be securely limited until the cell voltage is restored.

Also, with such a configuration, by setting the gains during the limitation of the supply current and the gains during the restoration so as to be suitable in their respective conditions, a rapid current limiting can be ensured while the occurrence of overshooting in a converging supply current can be suppressed.

In the fuel cell system according to the aspect above, it is preferable that, if a target output voltage of the entire fuel cell is changed during the current limiting processing, a current value of a limited supply current is maintained until the changed target output voltage becomes stable and then the current limiting processing is restarted.

In a fuel cell system, the target output voltage of a fuel cell is sometimes changed in accordance with an operation mode. By employing the configuration above, the limiting of the current by the PI compensation can be prevented from becoming unstable at the time of changing the target output voltage, thereby realizing a stable control for adjusting the supply current output by the fuel cell to be the target current value.

In addition, in the fuel cell system according to the aspect above, it is preferable that, when all the cell voltages are above the lowest-cell-voltage acceptable value and the current value of the system-request current falls below the current value of the limited supply current, the current limiting processing is stopped.

With such a configuration, since the current limiting processing including the current restoration processing is stopped only after the cell voltages are restored to be equal to or higher than the lowest-cell-voltage acceptable value and the supply current is restored, any possible disadvantages that may be generated in the fuel cell system can be securely avoided.

Also, the fuel cell system according to the aspect above includes: a cell voltage detector for detecting the cell voltage of each cell in the fuel cell; and a control computation section for performing the PI compensation with respect to the system-request current based on the lowest cell voltage obtained from the cell voltages detected by the cell voltage detector, in which: the control computation section computes a compensation value $\Delta I$ for limiting the supply current based on the relationship $Kp*\Delta V + Ki*\Sigma\Delta V$, where $\Delta V$ represents a deviation between the lowest-cell-voltage acceptable value and the lowest cell voltage, Kp represents a proportional gain, and Ki represents an integral gain; and both the proportional gain Kp and the integral gain Ki for limiting the supply current are different from the proportional gain Kp and the integral gain Ki for restoring the supply current.

With such a configuration, when the lowest cell voltage in the cell voltages falls below the lowest-cell-voltage acceptable value, the PI compensation computation is performed using the deviation $\Delta V$ between the lowest-cell-voltage acceptable value and the lowest cell voltage as a variable, using the proportional gain Kp as a coefficient for the P control, and using the integral gain Ki as a coefficient for the I control.

At this time, the proportional gain Kp and the integral gain Ki are changed between the time when the supply current is limited and the time when the supply current is restored, so as to be suitable for the respective conditions, and therefore the response can be improved in such a way that the current can be limited rapidly during the current limiting period, while the current can be prevented from being restored rapidly in order to suppress the occurrence of overshooting during the current restoration period.

Also, in fuel cell system according to the aspect above, the gains in the PI compensation for restoring the supply current are smaller than the gains in the PI compensation for limiting the supply current.

With such a configuration, the current can be limited rapidly using large gains for the PI compensation during the current limiting period, while the current can be restored so as to suppress the occurrence of overshooting using small gains for the PI compensation during the current restoration period, thereby providing improved control for adjusting the supply current, which is output by the fuel cell, to be a target current value.

BEST MODE FOR CARRYING OUT THE INVENTION

Figure 1:
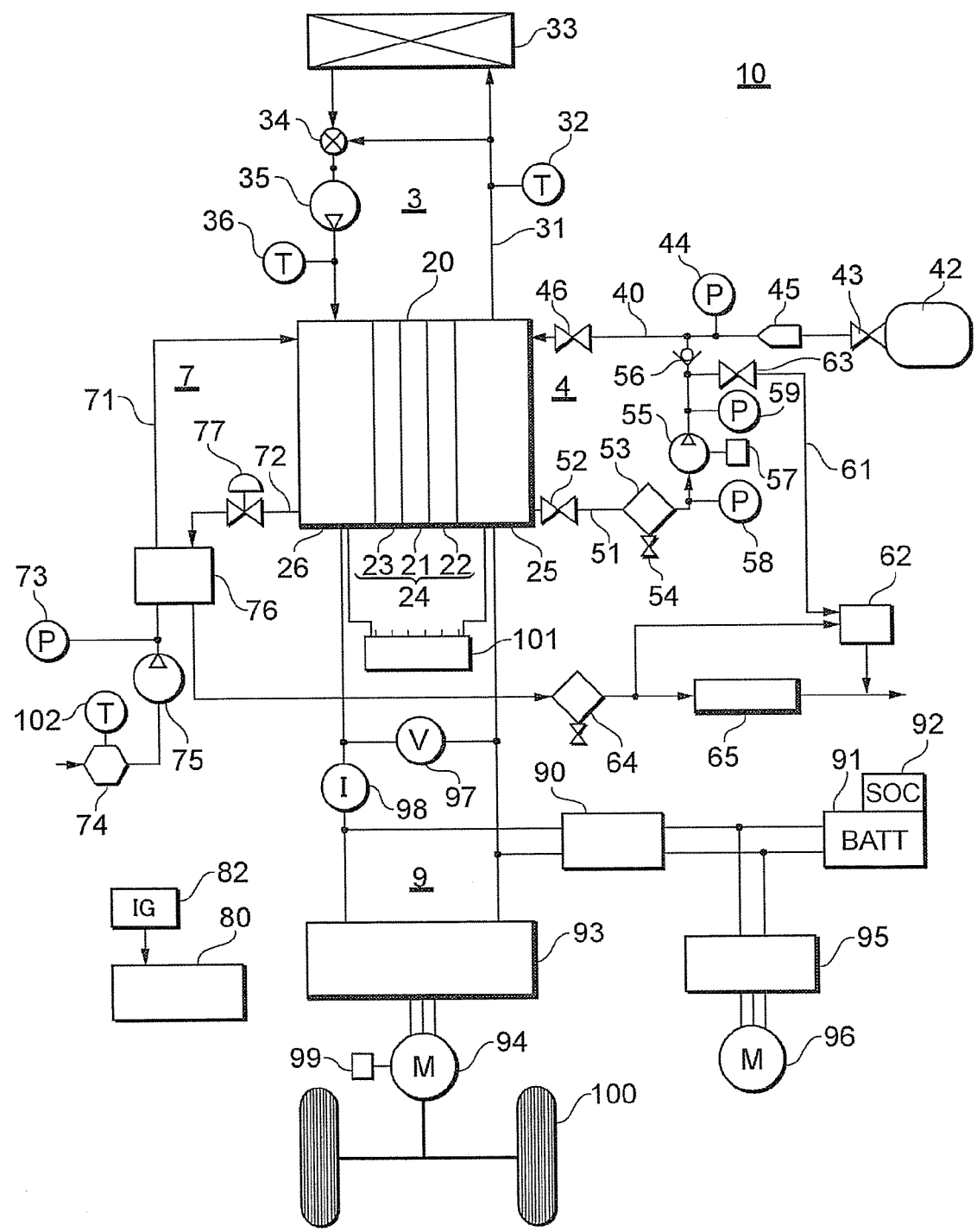
FIG. 1 is a system configuration diagram showing a fuel cell system according to the present invention.

FIG. 1 is a system configuration diagram showing a fuel cell system to which the present invention is applied.

In FIG. 1, a fuel cell system 10 includes: a fuel gas supply system 4 for supplying a fuel gas (hydrogen gas) to a fuel cell 20; an oxidant gas supply system 7 for supplying an oxidant gas (air) to the fuel cell 20; a coolant supply system 3 for cooling the fuel cell 20; and a power system 9 for charging and discharging generated power from the fuel cell 20.

The fuel cell 20 includes a membrane-electrode assembly (MEA) 24 which has been prepared by forming an anode 22 and a cathode 23 by screen printing, etc., on respective sides of a polymer electrolyte membrane 21 constituted from a proton-conducting ion-exchange membrane made of, for example, a fluororesin. Both sides of the membrane electrolyte assembly 24 are sandwiched by separators (not shown) each having flow paths for the fuel gas, oxidant gas and coolant, and a grooved anode gas channel 25 and a grooved cathode gas channel 26 are formed respectively between the separator and the anode 22 as well as between the separator and the cathode 23. The anode 22 is provided with a fuel-electrode catalyst layer provided on a porous support layer, while the cathode 23 is provided with an air-electrode catalyst layer provided on a porous support layer. The catalyst layers of these electrodes are formed with, for example, platinum particles adhering thereto.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

Note that although a structure of a unit cell including the membrane-electrode assembly 24, anode gas channel 25 and cathode gas channel 26 is schematically shown in FIG. 1 for convenience of explanation, the fuel cell actually includes a stack structure having a plurality of unit cells (cell group) which are connected in series via the above-described separators.

The coolant supply system 3 of the fuel cell system 10 is provided with a coolant path 31 for circulating coolant, a temperature sensor 32 for detecting the temperature of the coolant drained from the fuel cell 20, a radiator (heat exchanger) 33 for radiating the heat of the coolant to the outside, a valve 34 for adjusting an amount of the coolant to be introduced into the radiator 33, a coolant pump 35 for pressurizing and circulating the coolant, a temperature sensor 36 for detecting the temperature of the coolant to be supplied to the fuel cell 20, and the like.

Arranged in the fuel gas supply system 4 of the fuel cell system 10 are: a fuel gas supply device 42 for storing a fuel gas (anode gas), e.g., a hydrogen gas; a fuel gas flow path 40 for supplying the fuel gas from the fuel gas supply device 42 to the anode gas channel 25; and a circulation flow path (circulation path) 51 for circulating fuel-off gas exhausted from the anode gas channel 25 to the fuel gas flow path 40, these gas flow paths constituting the fuel gas circulation system.

The fuel gas supply device 42 is constituted by, for example, a high-pressure hydrogen tank, a hydrogen-absorbing alloy or a reformer. The fuel gas flow path 40 is provided with: a shut valve (main valve) 43 for controlling the fuel gas outflow from the fuel gas supply device 42; a pressure sensor 44 for detecting the pressure of the fuel gas; a regulating valve (ejector) 45 for regulating the fuel gas pressure of the circulation path 51; and a shut valve 46 for controlling the fuel gas supply to the fuel cell 20.

The circulation flow path 51 is provided with: a shut valve 52 for controlling the fuel-off gas supply from the fuel cell 20 to the circulation flow path 51; a gas-liquid separator 53 and an exhaust valve 54 for removing moisture contained in the fuel-off gas; a hydrogen pump (circulation pump) 55 for compressing the fuel-off gas, which has lost some pressure while passing through the anode gas channel 25, so as to increase the gas pressure to a suitable pressure and return the fuel-off gas to the fuel gas flow path 40; and a check valve 56 for preventing the fuel gas in the fuel gas flow path 40 from flowing back toward the circulation flow path 51. By driving the hydrogen pump 55 with a motor, the fuel-off gas resulting from the drive of the hydrogen pump 55 is joined in the fuel gas flow path 40 with the fuel gas supplied from the fuel gas supply device 42 and then supplied to and reused in the fuel cell 20. Note that the hydrogen pump 55 is provided with: a rotation speed sensor 57 for detecting the rotation speed of the hydrogen pump 55; and pressure sensors 58 and 59 for detecting the pressures of the circulation path before and after the hydrogen pump 55.

Also, in the circulation flow path 51, an exhaust flow path 61 for exhausting a vehicle the fuel-off gas, which has been exhausted from the fuel cell 20, to the outside of via a diluter (e.g., a hydrogen-concentration lowering device) 62 is arranged in such a manner that the exhaust flow path 61 branches from the circulation flow path 51. The exhaust flow path 61 is provided with a purge valve 63 and configured to be capable of controlling the exhaust of the fuel-off gas. By opening or closing the purge valve 63 to repeat circulation in the fuel cell 20, the exhaust flow path 61 can exhaust the fuel-off gas, in which the concentration of impurities has been increased, to the outside, and introduce fresh fuel gas, thereby preventing the cell voltage from decreasing. In addition, the exhaust flow path 61 can generate a pulse in the internal pressure of the circulation flow path 51 and remove moisture which has accumulated in the gas flow path.

Meanwhile, in the oxidant gas supply system 7 of the fuel cell system 10, an oxidant-gas flow path 71 for supplying oxidant gas (cathode gas) to the cathode gas channel 26 and a cathode-off gas flow path 72 for exhausting the cathode-off gas exhausted from the cathode gas channel 26 are arranged. The oxidant gas flow path 71 is provided with: an air cleaner 74 for introducing air from the atmosphere; and an air compressor 75 for compressing the introduced air and sending the compressed air to the cathode gas channel 26 as an oxidant gas. The air compressor 75 is provided with a pressure sensor 73 for detecting the air supply pressure of the air compressor 75. A humidifier 76 for performing moisture exchange is provided between the oxidant gas flow path 71 and the cathode-off gas flow path 72. The cathode-off gas flow path 72 is provided with a pressure-regulating valve 77 for regulating the exhaust pressure of the cathode-off gas flow path 72, a gas-liquid separator 64 for removing moisture contained in the cathode-off gas, and a muffler 65 for absorbing exhaust noise of the cathode-off gas. The cathode-off gas exhausted from the gas-liquid separator 64 is branched, and a part of the branched cathode-off gas flows into the diluter 62 and is mixed with the fuel-off gas held in the diluter 62 to be diluted, while the other part of the branched cathode-off gas is absorbed by the muffler 65, mixed with the gas which has been mixed and diluted by the diluter 62, and then exhausted to the outside of the vehicle.

The power system 9 in the fuel cell system 10 is connected to: a DC-DC converter 90, to which an output terminal of a battery 91 is connected on a primary side and an output terminal of the fuel cell 20 is connected on a secondary side; the battery 91 for storing surplus power as a secondary battery; a battery computer 92 for monitoring the state of charge of the battery 91; an inverter 93 for supplying an alternate-current power to a vehicle-drive motor 94 which serves as a load of or a target to be driven by the fuel cell 20; an inverter 95 for supplying an alternating-current power to various high-pressure auxiliary apparatuses 96 in the fuel cell system 10; a voltage sensor 97 for measuring an output voltage of the fuel cell 20; and a current sensor 98 for measuring an output current.

In addition, the fuel cell 20 is connected to a cell monitor 101 for detecting a voltage in each cell of the fuel cell 20. The cell monitor 101 is configured to detect the cell voltage of each cell and further detect the lowest cell voltage, being the cell voltage which has the lowest value in the cell voltages, the cell monitor 101 functioning as a lowest cell voltage detector of the present invention.

The DC-DC converter 90 performs voltage conversion with respect to surplus power of the fuel cell 20 or a regenerative power resulting from a braking operation for the vehicle-drive motor 94 and supplies the power to the battery 91 to charge the battery 91. Also, in order to compensate for the shortage of power generated by the fuel cell 20 with respect to the power that the vehicle-drive motor 94 requires, the DC-DC converter 90 performs voltage conversion with respect to a discharge power from the battery 91 and outputs the power to the secondary side.

The inverters 93 and 95 convert a direct current to a three-phase alternating current and output the converted current respectively to the vehicle-drive motor 94 and the high-pressure auxiliary apparatus 96. The vehicle-drive motor 94 is provided with a rotation speed sensor 99 for detecting the rotation speed of the motor 94. The motor 94 is mechanically coupled to wheels 100 via a differential so that the torque of the motor 94 can be converted to a driving power for the vehicle.

The voltage sensor 97 and the current sensor 98 are used for measuring an AC impedance based on the phase and amplitude of a current with respect to the voltage of an AC signal superimposed on the power system 9. The AC impedance corresponds to the moisture content of the fuel cell 20.

The fuel cell system 10 is further provided with a controller 80 for controlling power generation of the fuel cell 12. The controller 80 is constituted from a general purpose computer that includes, for example a CPU (Central Processing Unit), a RAM, a ROM and an interface circuit. The controller 80 is configured to: acquire sensor signals from the temperature sensors 32 and 36, the pressure sensors 44, 58 and 59 and the rotation speed sensors 57 and 99 as well as signals from the voltage sensor 97, current sensor 98 and an ignition switch 82; adjust the rotation speeds of the hydrogen pump 55 and the air compressor 75 by driving the respective motors in accordance with the status of battery operation, e.g., power load; and control various valves to open/close or adjust the degrees of the openings of the valves.

When controlling the output power of the fuel cell system 10, for example during a rapid warm-up (i.e., the state where the travel motor 94 is not operated), the controller 80 computes a vehicle system-request power (a system-request power requested by the system) Preq based on a lost power of a vehicle auxiliary apparatus, an amount of charge of the battery and a power limit rate of the high-pressure auxiliary apparatus 96, and computes a vehicle system-request current Ireq by dividing the system-request power Preq by a secondary voltage output from the DC-DC converter 90. At this time, the controller 80 performs current limiting processing based on the lowest cell voltage detected by the cell monitor 101.

Especially in this embodiment, the controller 80 functions as a control/computation unit for: computing a supply current separately for a current limiting period which is started from when the lowest cell voltage falls below the lowest-cell-voltage acceptable value and for a current restoration period starting from the point in time when the lowest cell voltage is restored; computing a voltage value to be directed as a command to the DC-DC converter 90 based on the supply current obtained in the above computation; and driving the DC-DC converter 90 based on the computation result.

Figure 2:
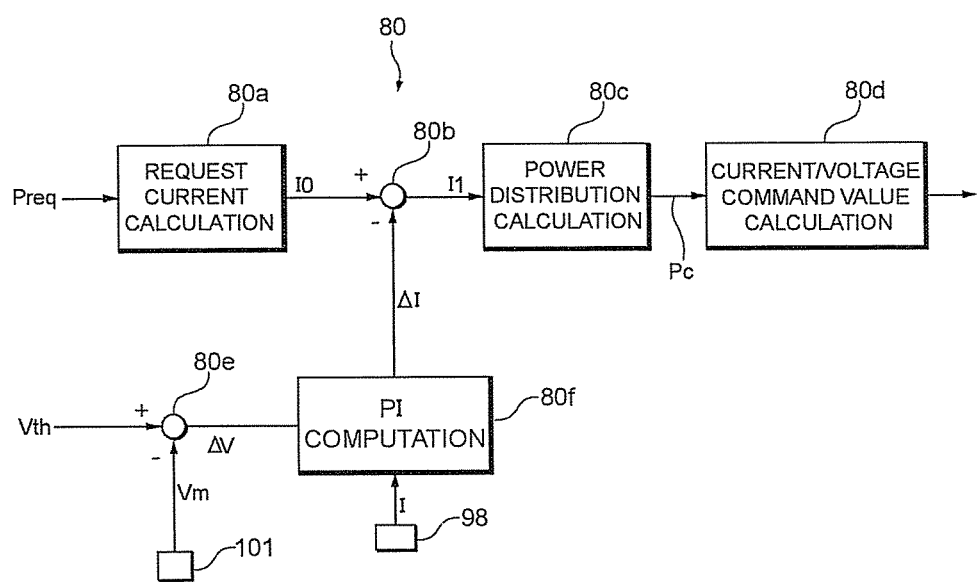
FIG. 2 is a block diagram showing a controller.

FIG. 2 is a functional block diagram showing the present embodiment which is realized by the controller 80 executing a predetermined computer program.

As shown in FIG. 2, the controller 80 includes, as a control/computation unit, a request current calculator 80a, a first subtractor 80b, a power distribution calculator 80c, a current/voltage command value calculator 80d, a second subtractor 80e, and a PI computation section 80f.

The request current calculator 80a calculates a request current (vehicle system-request current) $I_0$ based on the system-request power Preq, and outputs the calculated request current $I_0$ to the first subtractor 80b. More specifically, the request current calculator 80a divides the system-request power Preq by an output voltage VFC of the fuel cell 20 to compute the request current $I_0$.

Figure 3:
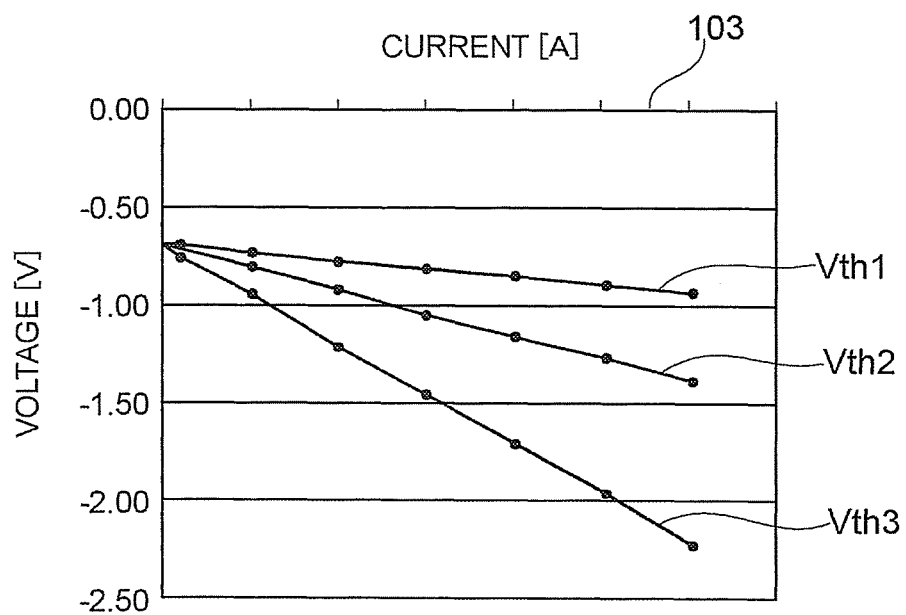
FIG. 3 is a characteristic chart of a lowest-cell-voltage acceptable map.

The lowest-cell-voltage acceptable value is a counter voltage which is allowable, for the purpose of protecting the fuel cell, as a cell voltage during a low temperature, the lowest-cell-voltage acceptable value being the value calculated from a reversal potential during a hydrogen gas shortage and an amount of reduction in a cathode potential due to a resistance value. The controller 80 has stored in memory in advance the lowest-cell-voltage acceptable value characteristics as shown in FIG. 3, as a lowest-cell-voltage acceptable map 103.

The second subtractor 80e refers to the lowest-cell-voltage acceptable value map 103 based on the output current IFC of the fuel cell 20 and the temperature of the fuel cell 20. In other words, when calculating a deviation ΔV, the second subtractor 80e makes a search in the lowest-cell-voltage acceptable map 103, as shown in FIG. 3, stored in the memory of the controller 80 based on a current detected by the current sensor 98 and an internal temperature of the fuel cell 20 detected by the temperature sensor 32, etc., or an environment temperature of the system detected by the temperature sensor 102, and selects a threshold value Vth indicating the lowest-cell-voltage acceptable value corresponding to the detected temperature. Since the threshold value Vth depends on a temperature and a current, the rate of change corresponding to the detected current varies in accordance with the detected temperature. For example, threshold values Vth1, Vth2 and Vth3 in FIG. 3 indicate the lowest-cell-voltage acceptable values at respective different temperatures, and the lowest cell voltage acceptable values show lines having characteristics in which the higher the temperature is the more gentle the slope becomes.

$$\text{Current limiting value } \Delta I = \text{lowest cell voltage deviation } \Delta V * \text{proportional gain Kp} + \text{lowest cell voltage integral value } \Sigma\Delta V * \text{integral gain Ki} \quad (4)$$

The PI computation section 80f calculates the current-limit value ΔI as a compensation amount for the request current $I_0$ and outputs the calculated value to the first subtractor 80b. The first subtractor 80b calculates a target current value $I_1$ as of this time from the deviation between the request current $I_0$ and the current-limit value ΔI, and outputs the calculated target current value $I_1$ to the power distribution calculator 80c.

Here, when the lowest cell voltage Vm falls below the lowest-cell-voltage acceptable value Vth and current limiting processing starts, the PI computation section 80f and the first subtractor 80b compensate the vehicle system-request current $I_0$ based on the current-limit value ΔI to calculate the supply current $I_1$ as the target current. At this time, the control is performed to calculate the supply current $I_1$ ($=I_0$) so as to inhibit current limiting, i.e., to calculate the supply current $I_1$ ($=I_0$) without compensating the request current based on the current-limit value ΔI, when the lowest cell voltage Vm exceeds the lowest-cell-voltage acceptable value Vth and the supply current $I_1$ exceeds the request current $I_0$ as of the time when the current limiting processing is started.

When the target output voltage of the fuel cell 20 is changed during power source limiting processing, the PI computation section 80f and the first subtractor 80b maintain the supply current $I_1$ as of the time when the target output voltage was changed, until the output voltage of the fuel cell 20 associated with the change in the target output voltage becomes stable. The target output voltage is a target value for the output value of the fuel cell 20, the value being changeable depending on whether or not the operation mode of the fuel cell 20 is, for example, a low-efficiency operation.

Based on the supply current obtained as a result of the processing described above, the power distribution calculator 80c calculates the upper and lower limits of a power command value for the fuel cell 20, and outputs the calculation result Pc to the current/voltage command value calculator 80d. These upper and lower limits of the power command value are limiting values used to prevent: an output accuracy from degrading due to the occurrence of charge and discharge by a capacity component of the stack; and the occurrence of hunting in the system request power due to variations in the amount of air supply.

The current/voltage command value calculator 80d outputs a current command value and a voltage command value to the DC-DC converter 90 based on the calculation result by the power distribution calculator 80c. These current command value and voltage command value serve as control signals for specifying an actual output current and output voltage in the fuel cell 20.

With reference to a timing chart in FIG. 4, as well as FIGS. 1 and 2, a sequence of processing operations by the controller 80 will be described below.

Figure 4:
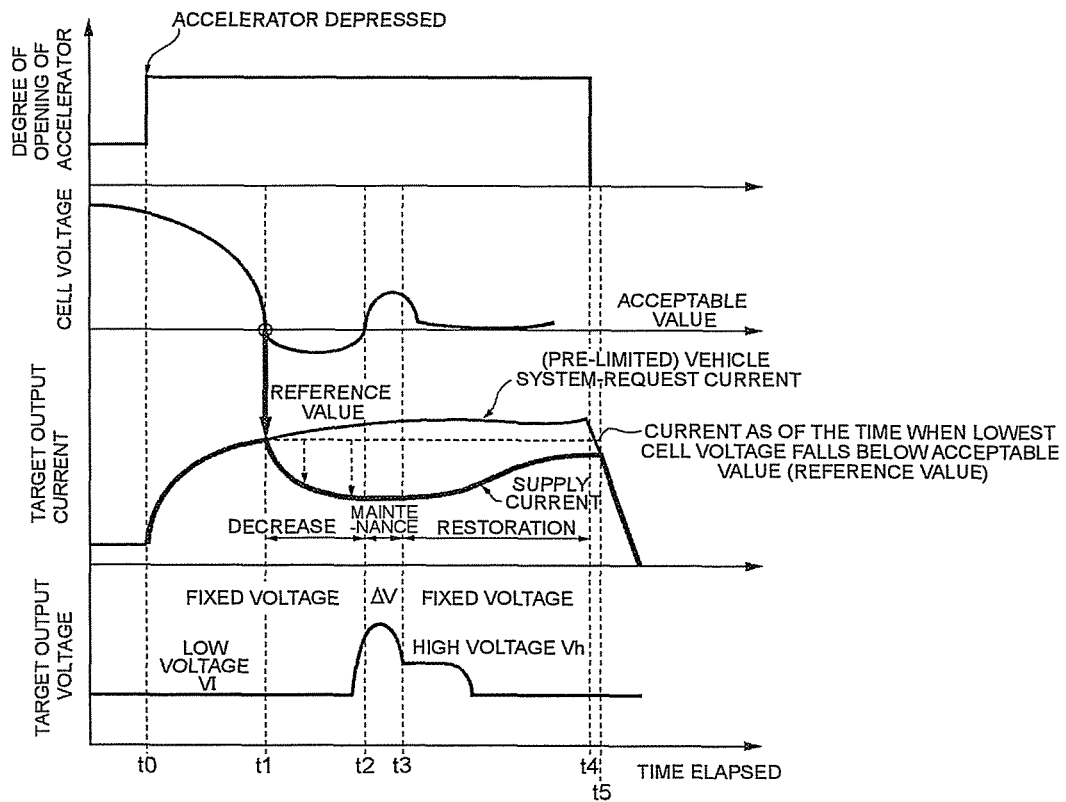
FIG. 4 is a timing chart explaining operations in current limiting processing.

As shown in FIG. 4, the target output voltage of the fuel cell 20 initially indicates a low voltage Vl. When an accelerator of the vehicle system is depressed at time to, the voltage on the secondary side of the DC-DC converter 90 is controlled, and the cell voltage of each cell drops while the current of the fuel cell 20 increases, in accordance with I-V characteristics. Accordingly, power generated by the fuel cell increases. Assuming the lowest cell voltage Vm in the cell voltages falls below the lowest-cell-voltage acceptable value Vth at time t1, the PI computation section 80f starts current limiting processing using PI compensation from the time point when the lowest cell voltage in the cell voltages falls below the lowest-cell-voltage acceptable value, and controls a supply current to decrease in order to restore the cell voltage.

Note that, in this PI compensation, the current value of the vehicle system-request current $I_0$ as of the time when the cell voltage falls below the acceptable value (i.e., time t1) is stored as a reference value by the first subtractor 80b and maintained until the end of the current limiting processing. During the current limiting processing, current-limit value $\Delta I$ calculated in the PI compensation computation by the PI computation section 80f is subtracted from this reference value for the current.

Here, the PI computation section 80f performs the above PI compensation computation based on expression (4) above, where a relatively large gain is employed in the PI compensation during the current limiting period (from time t1 to time t2) for limiting the supply current while a relatively small gain is employed in the PI compensation during the current restoration period (from time t3 to time t5) for restoring the supply current $I_1$.

As a result of the above PI compensation computation, the supply current $I_1$ starts to decrease immediately after the current limiting processing starts, while the restoration of the cell voltage is slow and the cell voltage starts to slightly increase later and is restored to the acceptable value. From the point in time when the cell voltage reaches the lowest voltage acceptable value (corresponding to time t3 in FIG. 4), the PI computation section 80f performs PI compensation for the current restoration processing to restore the current, based on expression (4). However, during this current restoration period, the PI compensation section 80f uses values smaller than the gain values used in the above current limiting period as the values for both the gain Kp and gain Ki. By using smaller gains in the PI compensation, a rapid variation in the current-limit value $\Delta I$, which is a compensation amount, can be suppressed, thereby suppressing the occurrence of overshooting in the supply current $I_1$. The current limiting processing is stopped when the cell voltage becomes equal to or higher than the lowest-cell-voltage acceptable value Vth and the vehicle system-request current $I_0$ reaches the limited supply current $I_1$.

Note that monitoring the cell voltages with respect to whether or not the lowest cell voltage is above the acceptable value is continued even during the current restoration period, and the current limiting processing is restarted if the lowest cell voltage falls below the acceptable value again.

As described above, when the target output voltage of the fuel cell 20 is changed during the power source limiting processing, the PI computing section 80f and the first subtractor 80b maintain the supply current as of the time when the target output voltage was changed, until the output voltage of the fuel cell 20, associated with the change in the target output voltage, becomes stable. In FIG. 4, the target output voltage of the fuel cell is changed from the low voltage V1 to high voltage Vh at time t2. Accordingly, the supply current has been maintained during a time period starting from time t2 when the target output voltage was changed from the low voltage V1 until time t3 when the output voltage of the fuel cell 20 becomes stable at the high voltage Vh. In other words, the PI computation section 80f does not perform the PI compensation computation based on expression (4) during this current maintenance period, and uses, as a value of the supply current $I_1$, the value calculated in the preceding PI compensation computation.

Figure 5:
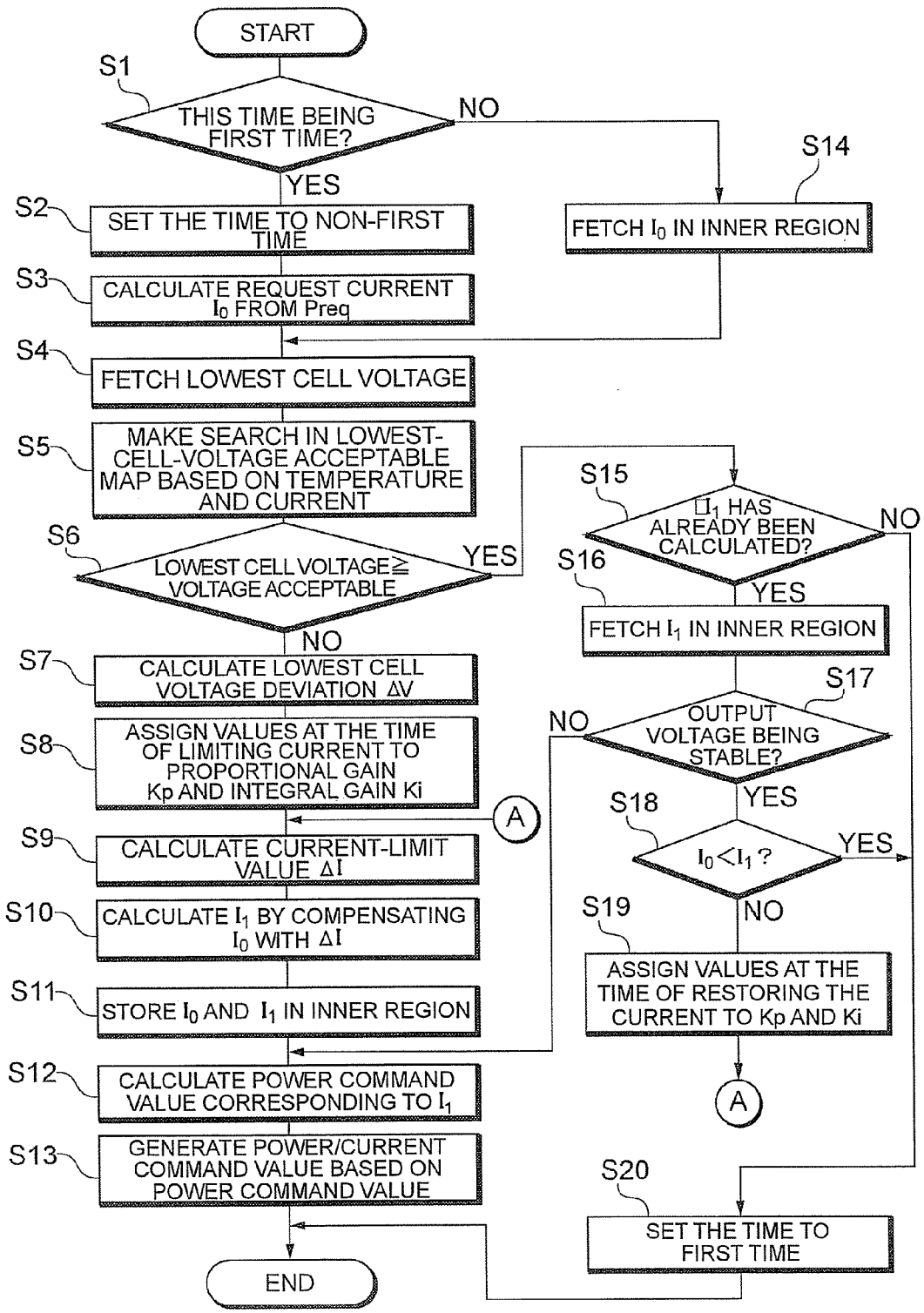
FIG. 5 is a flowchart explaining processing by the controller.

FIG. 5 is a flowchart explaining the above current limiting processing. The flow of processing operations by the controller 80 will be described below using the flowchart in FIG. 5, with reference to FIGS. 1 and 2.

First, in step S1, the request current calculator 80a of the controller 80 refers to a status flag to determine whether or not this time is the first time to perform current control. If the result indicates that this is the first time (YES), the processing proceeds to step S2, while if this is not the first time (NO), the processing proceeds to step S14.

In step S14, the request current calculator 80a of the controller 80 fetches a value of the request current $I_0$, which has been stored in an inner region, and the processing proceeds to step S4. In step S2, the request current calculator 80a of the controller 80 sets the time to "non-first time."

In step S3, when controlling an output power of the fuel cell system 10, the request current calculator 80a of the controller 80 calculates a system-request power Preq and calculates a request current $I_0$ for the fuel cell 20 based on the system-request power Preq.

Then, in step S4, the second subtractor 80e of the controller 80 acquires the lowest cell voltage Vm indicating the lowest value in cell voltages detected by the cell monitor 101.

In step S5, the second subtractor 80e detects a temperature and an output current of the fuel cell 20, refers to the lowest-cell-voltage acceptable map 103 corresponding to the detected temperature, and reads out the lowest-cell-voltage acceptable value Vth corresponding to the detected current.

In step S6, the second subtractor 80e judges whether or not the lowest cell voltage Vm is equal to or higher than the lowest-cell-voltage acceptable value Vth, and as a result of this judgment, if the lowest cell voltage Vm is equal to or higher than a lowest: cell: voltage acceptable value (YES), the processing proceeds to step S15, while if the lowest cell voltage Vm is lower than the lowest-cell-voltage acceptable value (NO), the processing proceeds to step S7 and the main current limiting processing in the present invention is performed as described below.

In step S7, the second subtractor 80e of the controller 80 calculates the deviation $\Delta V$ between a threshold value (lowest-cell-voltage acceptable value) Vth obtained from the lowest-cell-voltage acceptable value map 103 and the detected cell voltage Vm.

In Step S8, the PI computation section 80f of the controller 80 sets gain values, which have been preset to be used for the current limiting processing, respectively to a proportional gain Kp and integral gain Ki in expression (4).

Next, in step S9, the PI computation section 80f of the controller 80 calculates a current-limit value $\Delta I$ as a compensation amount for the request current $I_0$ based on expression (4) and using the calculated deviation $\Delta V$ and the set proportional gain Kp and integral gain Ki.

Then, in step S10, the first subtractor 80b of the controller 80 obtains the deviation between the request current $I_0$ and the current-limit value $\Delta I$, and outputs this deviation so as to be used as a supply current (target current value) $I_1$ as of this time.

In step S11, the first subtractor 80b of the controller 80 stores the request current $I_0$ and the target current value $I_1$ in the inner region.

Next, in step S12, the power distribution calculator 80c of the controller 80 calculates upper and lower limits for a power command value based on the supply current which has been obtained by compensating the request current $I_0$ by the current-limit value $\Delta I$.

In step S13, the current/voltage command value calculator 80d of the controller 80 outputs a voltage command value and a current command value as a drive signal for controlling the DC-DC converter 90, based on the calculated power command value. In other words, the current/voltage command value calculator 80d controls the amount of power to be generated and output power of the fuel cell 20 based on a supply current that maintains the cell voltage Vm so as not to be equal to or lower than the threshold value (lowest-cell-voltage acceptable value) Vth, and ends the processing of this routine.

On the other hand, if the lowest cell voltage is equal to or higher than the lowest-cell-voltage acceptable value in step S6 (YES), the processing proceeds to step S15, and the PI computation section 80f of the controller 80 determines whether or not the supply current has already been calculated in step S10. If the supply current $I_1$ has already been calculated in step S10 (YES), the processing proceeds to step S16, while if the supply current $I_1$ has not been calculated in step S10 (NO), i.e., the flow of control operations has not passed step S10, the processing proceeds to step S20.

In step S16, the PI computation section 80f of the controller 80 fetches the value of the supply current $I_1$ stored in the inner region.

The processing then proceeds to step S17, where the PI computation section 80f of the controller 80 determines whether the target output voltage of the fuel cell 20 is stable or not by comparing the target output voltage which is currently set with an actual output voltage detected by the voltage sensor 97, etc. If the target output voltage of the fuel cell 20 is determined to be stable (YES), the processing proceeds to step S18, while if the target output voltage of the fuel cell 20 is determined to be unstable (NO), the processing proceeds to step S12.

In step S18, the PI computation section 80f of the controller 80 determines whether or not the supply current $I_1$ is above the request current $I_0$ as of the time when the limiting of the current is started. If the supply current is not above the request current $I_0$ as of the time when the limiting of the current is started (NO), it is determined that the limiting of the current should be continued and the processing proceeds to step S19. On the other hand, if the supply current $I_1$ is above the request current $I_0$ as of the time when the limiting of the current is started (YES), it is determined that the current limiting processing should be ended and the processing proceeds to step S20.

In step S19, the PI computation section 80f of the controller 80 sets gain values, which have been preset to be used during the current restoration, respectively to the proportional gain Kp and integral gain Ki in expression (4), and the processing proceeds to step S9.

In step 20, the request current calculator 80a of the controller 80 sets the time to the first time.

As described above, in the present embodiment, when the lowest cell voltage Vm falls below the lowest-cell-voltage acceptable value Vth, the PI compensation computation is performed using the current value $I_0$ requested by the system at this time as a reference value, and therefore the system request power can be prevented from increasing in accordance with the decrease in the supply current during the current limiting processing, thereby realizing reliable current limiting processing. For example, even when a driver regards a current-limited state as being an output shortage and depresses an accelerator in an automobile equipped with a fuel cell system, a reference value for the computation of the supply current is fixed to a current value at the time of starting the current limiting processing, and therefore the current can be securely limited until the cell voltage is restored.

In addition, the gains Kp and Ki during the limitation of the supply current $I_1$ and the gains Kp and Ki during the restoration are set so as to be suitable in their respective conditions, and therefore a rapid current limiting can be ensured while the occurrence of overshooting in a converging supply current can be prevented.

Also, if the target output voltage of the entire fuel cell is changed during the current limiting period, the current value of the limited current is maintained until the changed target output voltage becomes stable and then the current limiting processing is restarted, and therefore the limiting of the current using the PI compensation can be prevented from being unstable.

In addition, since the current limiting processing including the current restoration processing is stopped in the state where both the supply current and the lowest cell voltage Vm are restored and the request power Preq can be supplied, maintenance for the fuel cells can be ensured and control can be provided without affecting the operation of the system.

(Modifications)

The present invention is not limited to the above embodiment, and can be modified in various ways in applications.

For example, although the PI compensation is based on expression (4) in the above embodiment, it is not limited to this relational expression. The present invention can be applied to relational expressions suitable for a responsive control for a fuel cell system, so that gains in the current limiting period and gains in the current restoration period can be made different from each other. In short, any relational expression can be employed as long as a current can be limited rapidly during the limitation of the current and a transient response can be controlled so as not to cause an unstable control such as overshooting during the current restoration.

In the above embodiment, a current-limit value $\Delta I$ is computed and the current-limit value $\Delta I$ is subtracted from the current value $I_0$ as a reference value, but the processing is not limited thereto. For example, a computation in which a reference value is directly changed can be employed.

INDUSTRIAL APPLICABILITY

In the present invention, since a system-request current value as of the time when the lowest cell voltage in cells falls below a predetermined lowest-cell-voltage acceptable value is used as a reference value to perform a PI compensation computation, the increase in the system-request power in accordance with the decrease in the supply current during the current limiting processing can be suppressed, which enables the current to be securely limited until the cell voltage is restored. Also, in the present invention, gains during the limitation of a supply current and gains during the restoration are changed so as to be suitable in their respective conditions, therefore a rapid current limiting can be ensured while the occurrence of overshooting in the converging supply current can be prevented.

What is claimed is:

1. A fuel cell system comprising a fuel cell with a plurality of cells and a controller for performing processing for limiting a supply current to be supplied to a load by performing a compensation computation with respect to a system-request current corresponding to a system-request power requested by the system based on a lowest cell voltage in the cells, the controller being programmed to:
    perform the compensation computation for limiting the supply current through a proportional integral compensation using, as a reference value, a current value of the system-request current as of the time when the lowest cell voltage falls below a predetermined lowest-cell-voltage acceptable value,
    wherein values for gains in the proportional integral compensation for decreasing the supply current is different from values for gains in the proportional integral compensation for increasing the supply current, and
    wherein the gains in the proportional integral compensation for increasing the supply current are smaller than the gains in the proportional integral compensation for decreasing the supply current.

2. The fuel cell system according to claim 1, wherein if a target output voltage of the entire fuel cell is changed during the current limiting processing, a current value of a limited supply current is maintained until the changed target output voltage becomes stable and then the current limiting processing is restarted.

3. The fuel cell system according to claim 1, wherein when all the cell voltages are above the lowest-cell-voltage acceptable value and the current value of the system-request current falls below the current value of the limited supply current, the current limiting processing is stopped.

4. The fuel cell system according to claim 1, comprising:
    a cell voltage detector for detecting the cell voltage of each cell in the fuel cell; and
    a control computation section for performing the proportional integral compensation with respect to the system-request current based on the lowest cell voltage obtained from the cell voltages detected by the cell voltage detector, wherein:
    the control computation section computes a compensation value AI for limiting the supply current based on the relationship below:

$Kp*\Delta V + Ki*\Sigma \Delta V$, where $\Delta V$ represents a deviation between the lowest-cell-voltage acceptable value and the lowest cell voltage, Kp represents a proportional gain, and Ki represents an integral gain, and
    both the proportional gain Kp and the integral gain Ki for decreasing the supply current are different from the proportional gain Kp and the integral gain Ki for increasing the supply current.

5. A fuel cell system, comprising:
    a fuel cell having a plurality of cells;
    a cell monitor for detecting cell voltages of the cells; and
    a controller comprising a deviation calculator, a proportional integral computation section, and supply current calculator, the controller programmed to:
    calculate a deviation between a lowest cell voltage in the detected cell voltages and a predetermined lowest-cell-voltage acceptable value with the deviation calculator;
    calculate a current-limit value through proportional integral compensation based on the calculated deviation with the proportional integral computation section; and
    calculate a supply current by subtracting the current-limit value from a system-request current requested by the system with the supply current calculator, and
    prohibiting the subtraction of the current-limit value when the lowest cell voltage is equal to or higher than the lowest-cell-voltage acceptable value with the supply current calculator,
    wherein the proportional integral computation section sets different values between gains in the proportional integral compensation when the lowest cell voltage is lower than the lowest-cell-voltage acceptable value and gains in the proportional integral compensation when the lowest cell voltage is equal to or higher than the lowest-cell-voltage acceptable value, and
    wherein the gains in the proportional integral compensation for increasing the supply current are smaller than the gains in the proportional integral compensation for decreasing the supply current.

6. A method for limiting a current in a fuel cell system that includes: a fuel cell having a plurality of cells; and a controller for computing a supply current to be supplied to a load based on a system-request power requested by a system, the method comprising steps, performed by the controller, of:
    computing the system-request power requested by the system;
    detecting a lowest cell voltage in the cells;
    judging whether or not the lowest cell voltage falls below a predetermined lowest-cell-voltage acceptable value; and
    performing, when the lowest cell voltage falls below the lowest-cell-voltage acceptable value, a compensation computation for limiting the supply current through a proportional integral compensation using, as a reference value, a current value of the system-request current as of the time when the lowest cell voltage falls below the predetermined lowest-cell-voltage acceptable value,
    wherein values for gains in the proportional integral compensation for decreasing the supply current are different from values for gains in the proportional integral compensation for increasing the supply current, and
    wherein the gains in the proportional integral compensation for increasing the supply current are smaller than the gains in the proportional integral compensation for decreasing the supply current.

* * * * *